United States Patent
Vaughan et al.

[11] Patent Number: 5,866,234
[45] Date of Patent: Feb. 2, 1999

[54] FIRE RESISTANT GRILL MAT SYSTEM

[76] Inventors: Daniel R. Vaughan; Cheryl L. Vaughan, both of 67 Lauren La., Coatesveille, Pa. 19320

[21] Appl. No.: 850,374

[22] Filed: May 2, 1997

[51] Int. Cl.$^6$ ................................. B32B 3/00; A47G 9/06
[52] U.S. Cl. ........................ 428/172; 428/141; 428/159; 428/192; 428/920; 5/417
[58] Field of Search ..................... 428/156, 192, 428/75, 172, 45, 81, 141, 159, 520, 522, 920, 921; 5/417, 420; 296/38; 15/215, 238

[56] References Cited

U.S. PATENT DOCUMENTS

| | | | |
|---|---|---|---|
| 2,284,254 | 5/1942 | Batcheller | 428/136 |
| 5,028,468 | 7/1991 | Taylor | 428/71 |
| 5,114,774 | 5/1992 | Maxim | 428/101 |
| 5,196,253 | 3/1993 | Mueller et al. | 428/75 |
| 5,236,753 | 8/1993 | Gaggero et al. | 428/43 |

*Primary Examiner*—Donald Loney

[57] ABSTRACT

A new Fire Resistant Grill Mat System for protecting a surface whereupon a conventional grill rests upon by capturing grease, charcoal and other debris descending from the conventional grill during operation thereof. The inventive device includes a stratified mat having a Teflon fire resistant material layer and a rubber layer, an outer ridge for preventing run-off of the accumulated debris, and a plurality of semi-spherical indentions projecting into the rubber layer for cushioning.

4 Claims, 2 Drawing Sheets

FIRE RESISTANT GRILL MAT SYSTEM

BACKGROUND OF THE INVENTION

1. Field of the Invention

The present invention relates to Mat Devices and more particularly pertains to a new Fire Resistant Grill Mat System for protecting a surface whereupon a conventional grill rests upon by capturing grease, charcoal and other debris descending from the conventional grill during operation thereof.

2. Description of the Prior Art

The use of Mat Devices is known in the prior art. More specifically, Mat Devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art Mat Devices include U.S. Pat. No. 5,236,753; U.S. Pat. No. 5,028,468; U.S. Design Pat. No. 343,087; U.S. Design Pat. No. 330,988; U.S. Design Pat. No. 350,253; and U.S. Pat. No. 5,114,774.

While these devices fulfill their respective, particular objectives and requirements, the aforementioned patents do not disclose a new Fire Resistant Grill Mat System. The inventive device includes a stratified mat having a Teflon fire resistant material layer and a rubber layer, an outer ridge for preventing run-off of the accumulated debris, and a plurality of semi-spherical indentions projecting into the rubber layer for cushioning.

In these respects, the Fire Resistant Grill Mat System according to the present invention substantially departs from the conventional concepts and designs of the prior art, and in so doing provides an apparatus primarily developed for the purpose of protecting a surface whereupon a conventional grill rests upon by capturing grease, charcoal and other debris descending from the conventional grill during operation thereof.

SUMMARY OF THE INVENTION

In view of the foregoing disadvantages inherent in the known types of Mat Devices now present in the prior art, the present invention provides a new Fire Resistant Grill Mat System construction wherein the same can be utilized for protecting a surface whereupon a conventional grill rests upon by capturing grease, charcoal and other debris descending from the conventional grill during operation thereof.

The general purpose of the present invention, which will be described subsequently in greater detail, is to provide a new Fire Resistant Grill Mat System apparatus and method which has many of the advantages of the Mat Devices mentioned heretofore and many novel features that result in a new Fire Resistant Grill Mat System which is not anticipated, rendered obvious, suggested, or even implied by any of the prior art Mat Devices, either alone or in any combination thereof.

To attain this, the present invention generally comprises a stratified mat having a Teflon layer and a rubber fire resistant material layer, an outer ridge for preventing run-off of the accumulated debris, and a plurality of semi-spherical indentions projecting into the rubber layer for cushioning.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Fire Resistant Grill Mat System apparatus and method which has many of the advantages of the Mat Devices mentioned heretofore and many novel features that result in a new Fire Resistant Grill Mat System which is not anticipated, rendered obvious, suggested, or even implied by any of the prior art Mat Devices, either alone or in any combination thereof.

It is another object of the present invention to provide a new Fire Resistant Grill Mat System which may be easily and efficiently manufactured and marketed.

It is a further object of the present invention to provide a new Fire Resistant Grill Mat System which is of a durable and reliable construction.

An even further object of the present invention is to provide a new Fire Resistant Grill Mat System which is susceptible of a low cost of manufacture with regard to both materials and labor, and which accordingly is then susceptible of low prices of sale to the consuming public, thereby making such Fire Resistant Grill Mat System economically available to the buying public.

Still yet another object of the present invention is to provide a new Fire Resistant Grill Mat System which provides in the apparatuses and methods of the prior art some of the advantages thereof, while simultaneously overcoming some of the disadvantages normally associated therewith.

Still another object of the present invention is to provide a new Fire Resistant Grill Mat System for protecting a surface whereupon a conventional grill rests upon by capturing grease, charcoal and other debris descending from the conventional grill during operation thereof.

Yet another object of the present invention is to provide a new Fire Resistant Grill Mat System which includes a stratified mat having a Teflon fire resistant material layer and a rubber layer, an outer ridge for preventing run-off of the accumulated debris, and a plurality of semi-spherical indentions projecting into the rubber layer for cushioning.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
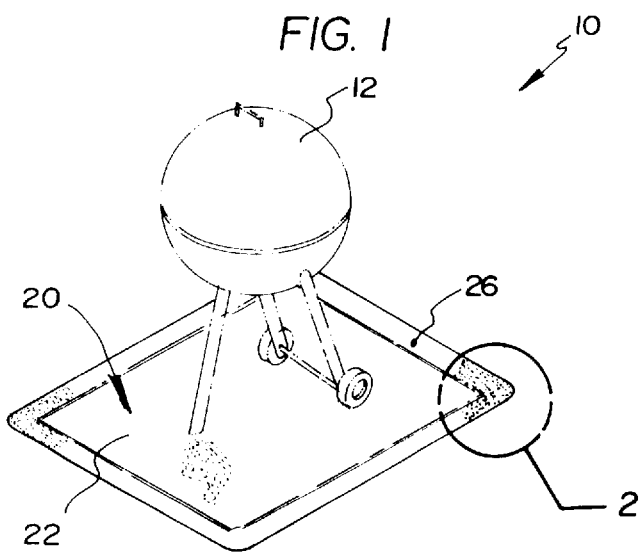
FIG. 1 is an upper perspective view of a new Fire Resistant Grill Mat System according to the present invention.

With reference now to the drawings, and in particular to FIGS. 1 through 4 thereof, a new Fire Resistant Grill Mat System embodying the principles and concepts of the present invention and generally designated by the reference numeral 10 will be described.

As best illustrated in FIGS. 1 through 4, the Fire Resistant Grill Mat System 10 comprises a stratified mat 20 having at least an upper layer 22 and a lower layer 24, and the upper layer 22 is resistant to fire for preventing heated debris from starting the surface upon fire. The upper layer 22 is preferably constructed of Teflon for preventing a fire from starting within the upper layer 22. The lower layer 24 is preferably constructed of a resilient rubber for providing maximum comfort for the user. The invention protects a surface whereupon a conventional grill rests upon by capturing grease, charcoal and other debris descending from the conventional grill during operation thereof.

Figure 2:
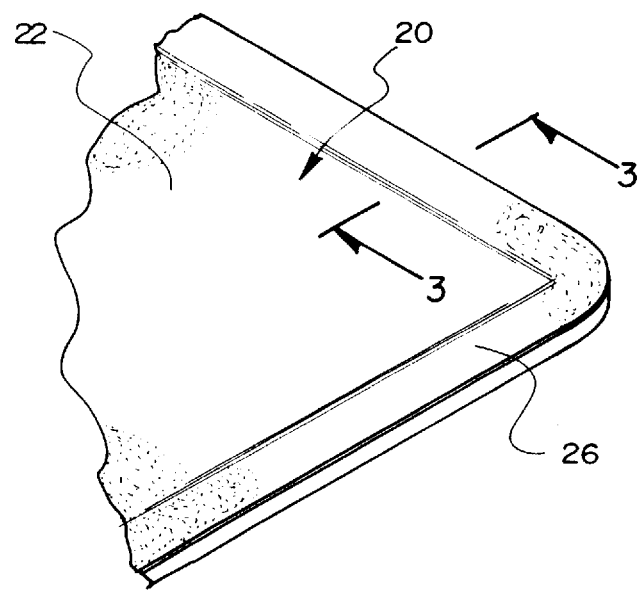
FIG. 2 is a magnified upper perspective view of the present invention from FIG. 1.
Figure 3:
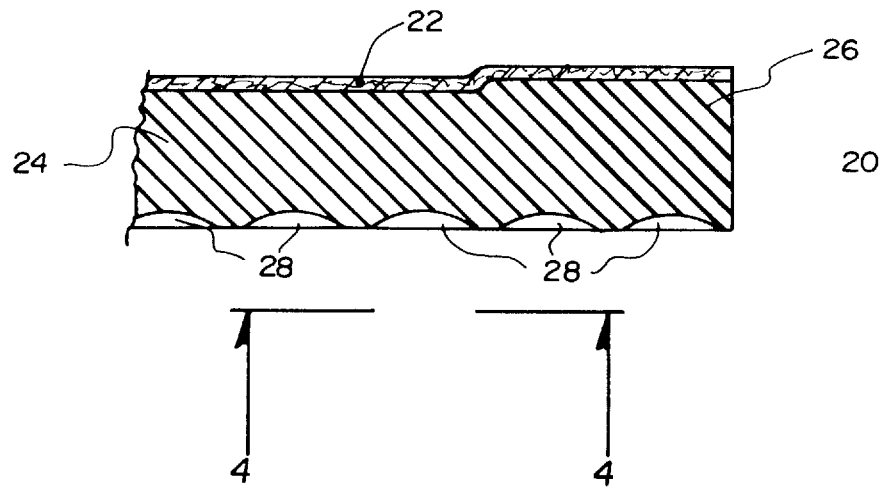
FIG. 3 is a cross sectional view taken along line 3—3 of FIG. 2.
Figure 4:
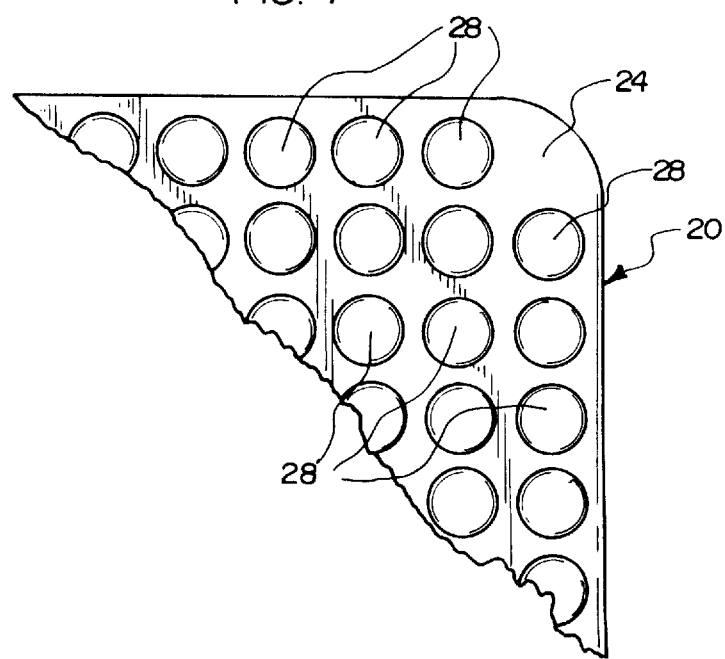
FIG. 4 is a cross sectional view taken along line 4—4 of FIG. 3.

As shown in FIGS. 1 through 3 of the drawings, an outer ridge 26 is formed into an outer perimeter of the lower layer 24 for preventing run-off of accumulated debris. As shown in FIGS. 3 and 4 of the drawings, a plurality of indentions 28 project into the lower layer 24 opposite of the upper layer 22 for providing a cushion for a user walking upon the stratified mat 20. The indentions 28 are preferably semi-spherical shaped as shown in FIGS. 3 and 4 of the drawings.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A fire resistant grill mat system for protecting a surface whereupon a conventional grill rests upon by capturing grease, charcoal and other debris descending from the conventional grill during operation thereof, comprising:

a stratified mat having at least an upper layer and a resilient lower layer;

said upper layer is resistant to fire for preventing heated debris from starting said surface upon fire;

said upper layer protects said lower from grease and heated debris;

an raised outer ridge formed into an outer perimeter barrier of said lower layer and said upper layer for preventing run-off of accumulated debris; and a plurality of indentations projecting into said lower layer opposite of said upper layer for providing a cushion for a user walking upon said stratified mat.

2. The fire resistant grill mat system of claim 1, wherein said indentations are semi-spherical shaped.

3. The fire resistant grill mat system of claim 1, wherein said upper layer is comprised of Teflon fire resistant material.

4. The fire resistant grill mat system of 1, wherein said lower layer is comprised of a resilient rubber.

\* \* \* \* \*